(12) United States Patent
Bettio

(10) Patent No.: US 10,550,872 B2
(45) Date of Patent: Feb. 4, 2020

(54) AUTOMATIC COUPLING DEVICE

(71) Applicant: REXSITT ITALIA S.R.L., Bertinoro (IT)

(72) Inventor: Stefano Bettio, Volpago del Montello (IT)

(73) Assignee: REXSITT ITALIA S.R.L., Bertinoro (IT)

( * ) Notice: Subject to any disclaimer, the term of this patent is extended or adjusted under 35 U.S.C. 154(b) by 369 days.

(21) Appl. No.: 15/506,058

(22) PCT Filed: Aug. 25, 2015

(86) PCT No.: PCT/EP2015/069407
§ 371 (c)(1),
(2) Date: Feb. 23, 2017

(87) PCT Pub. No.: WO2016/180503
PCT Pub. Date: Nov. 17, 2016

(65) Prior Publication Data
US 2018/0172049 A1    Jun. 21, 2018

(30) Foreign Application Priority Data
May 13, 2015    (IT) .............................. RA20150011 U

(51) Int. Cl.
*F16B 12/38*    (2006.01)
(52) U.S. Cl.
CPC ......... *F16B 12/38* (2013.01); *Y10T 24/45241* (2015.01); *Y10T 403/591* (2015.01); *Y10T 403/608* (2015.01)
(58) Field of Classification Search
CPC ... A47B 88/95; A47B 2088/951; F16B 12/26; F16B 12/38; F16B 17/008; Y10T 24/44026; Y10T 24/45241; Y10T 24/45471; Y10T 24/45529; Y10T 403/59; Y10T 403/591; Y10T 403/60; Y10T 403/608
(Continued)

(56) References Cited

U.S. PATENT DOCUMENTS 4,416,040 A * 11/1983 Towsley ................. D03D 29/00
403/330
4,715,096 A * 12/1987 Fleming ................ B60R 22/322
24/602
(Continued)

FOREIGN PATENT DOCUMENTS

AT      391408 B    10/1990
GB      2263136 A    7/1993

OTHER PUBLICATIONS

International Search Report and Written Opinion dated Feb. 4, 2016 issued in PCT/EP2015/069407.

*Primary Examiner* — Josh Skroupa
(74) *Attorney, Agent, or Firm* — Scully, Scott, Murphy & Presser, P.C.

(57) ABSTRACT

A coupling device comprising arranged in two opposing walls of a box-like enclosure, two flexible tabs from which two raised portions which act against each other protrude inward, one of which is adapted to engage a rigid laminar element to be inserted between the two flexible tabs while the other, after the coupling, can be pushed manually in order to move the coupled raised portion and release the rigid laminar element to be removed.

5 Claims, 6 Drawing Sheets

(58) Field of Classification Search
USPC .... 403/321, 322.1, 326, 330; 24/458, 593.1, 24/604, 615
See application file for complete search history.

(56) References Cited

U.S. PATENT DOCUMENTS

| | | | | |
|---|---|---|---|---|
| 4,815,796 | A * | 3/1989 | Rock .................. | A47B 88/95 |
| | | | | 312/263 |
| 4,974,987 | A * | 12/1990 | Smock ................ | E04B 2/744 |
| | | | | 403/322.1 |
| 5,113,556 | A * | 5/1992 | Murai ................ | A44B 11/263 |
| | | | | 24/615 |
| 5,855,057 | A * | 1/1999 | Anscher ............. | A44B 11/263 |
| | | | | 24/615 |
| 6,430,846 | B1 | 8/2002 | Lin | |
| 7,200,899 | B2 * | 4/2007 | Sagol ................. | F16B 12/38 |
| | | | | 24/458 |
| 8,425,140 | B2 * | 4/2013 | Wei ................... | F16B 5/0657 |
| | | | | 403/330 |
| 9,167,717 | B2 * | 10/2015 | Chen .................. | H05K 7/1491 |

* cited by examiner

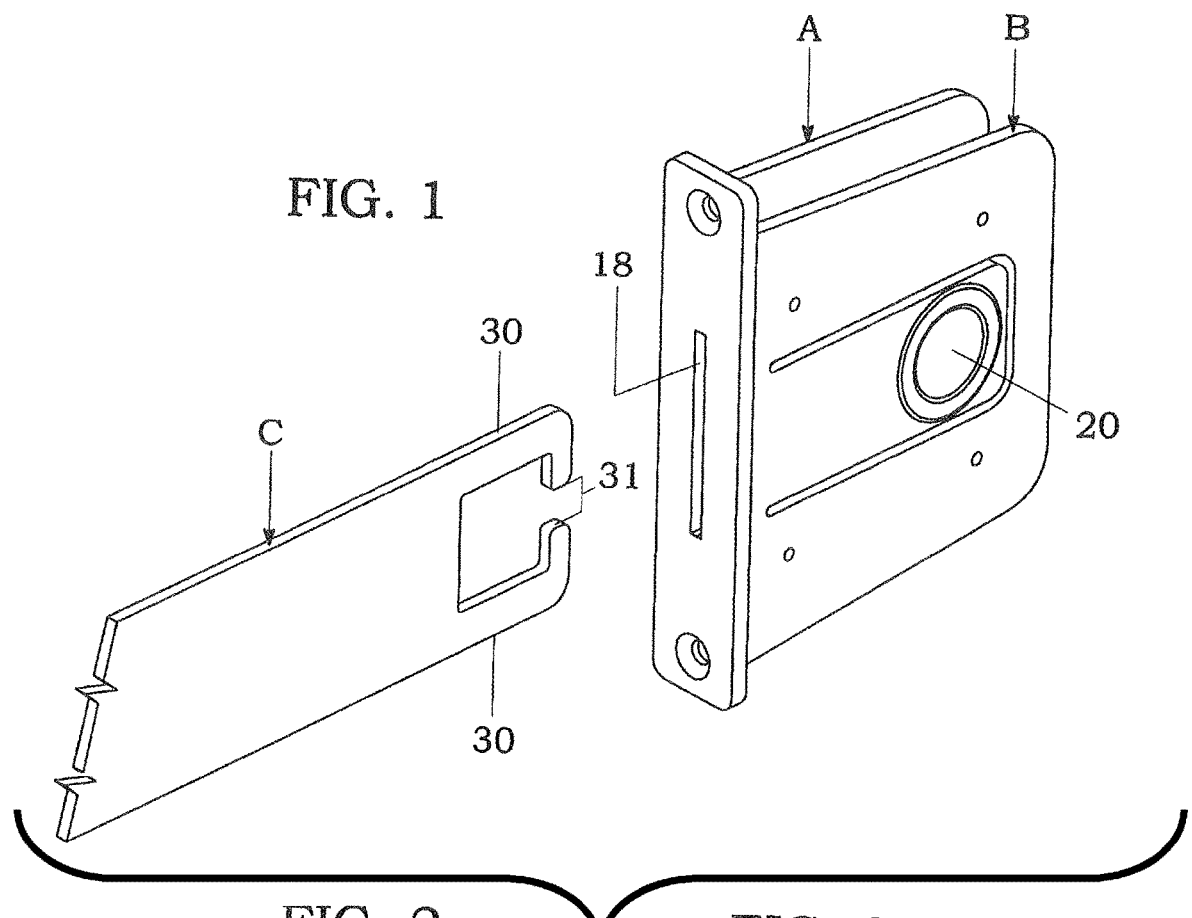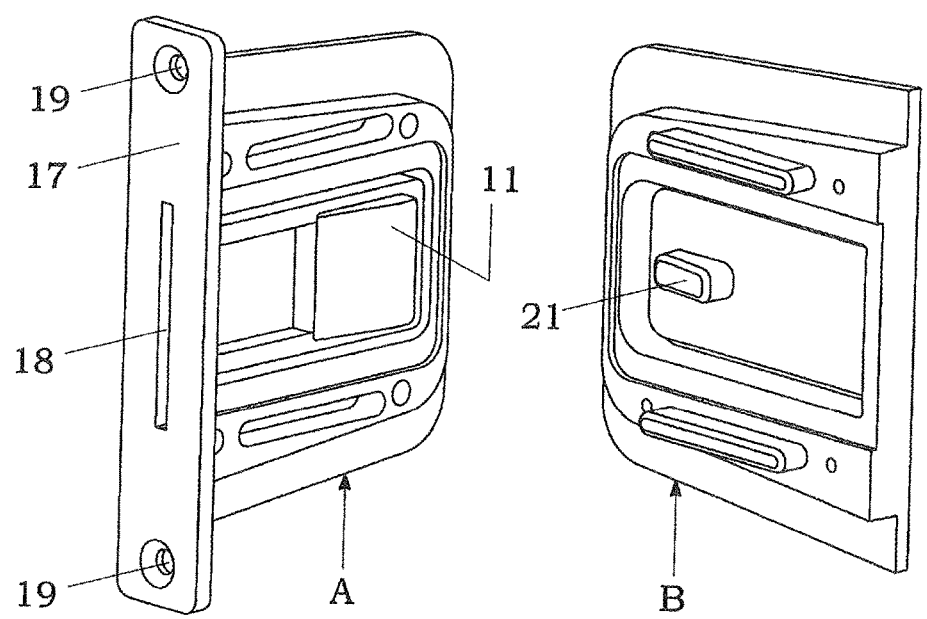

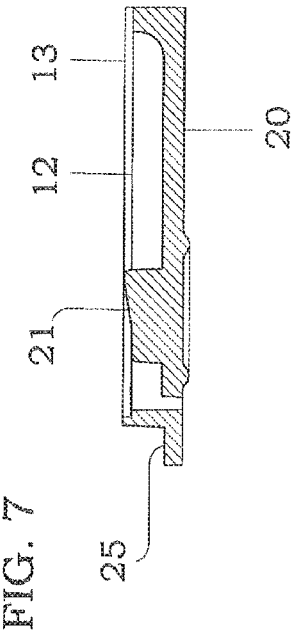
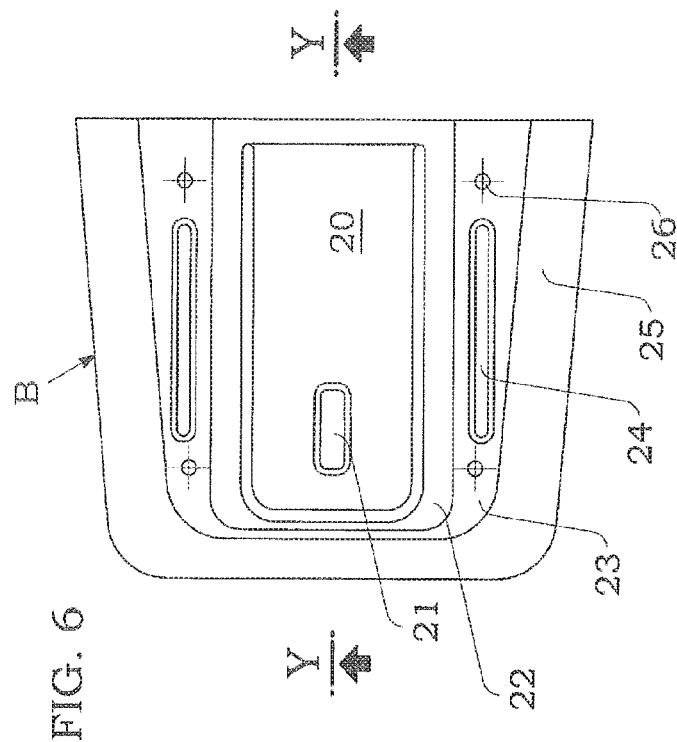
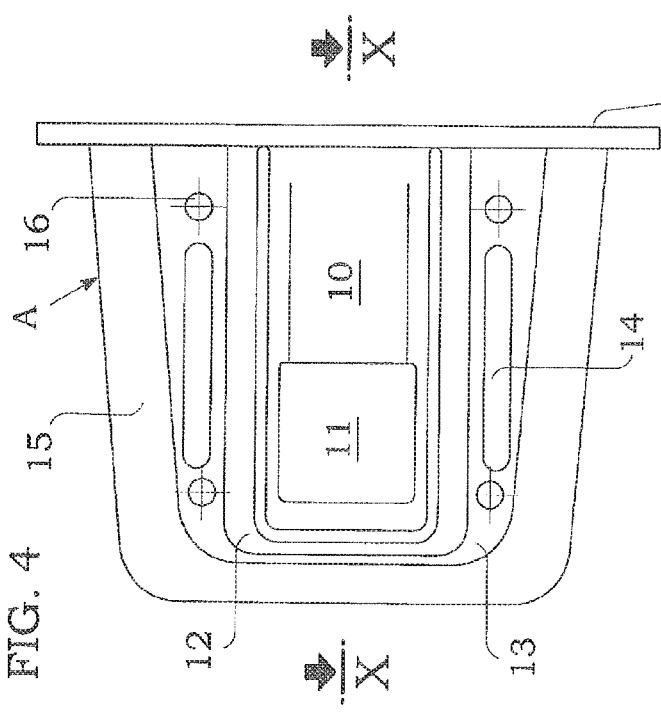
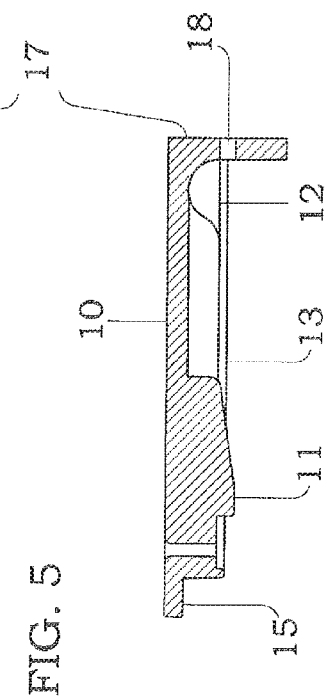

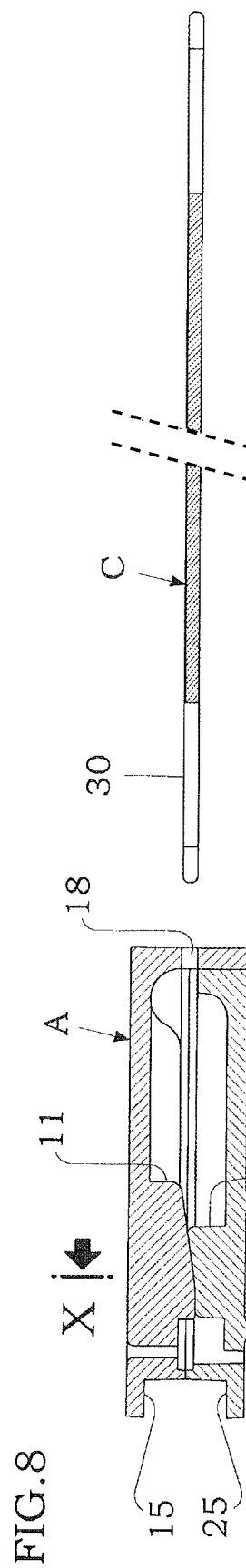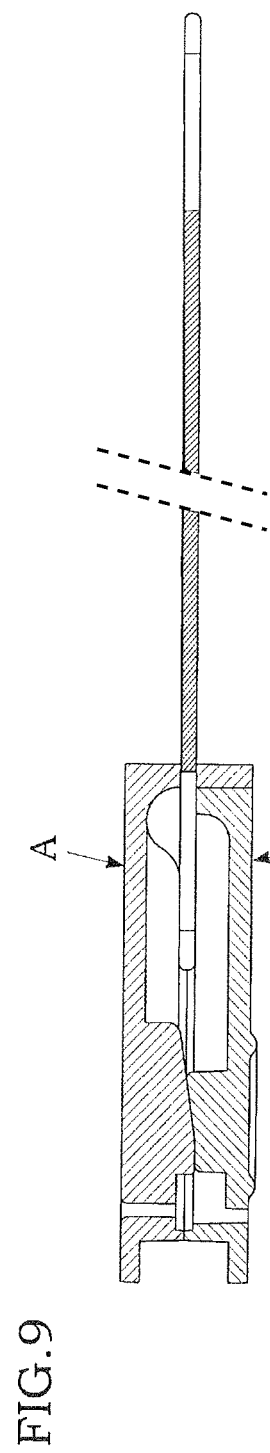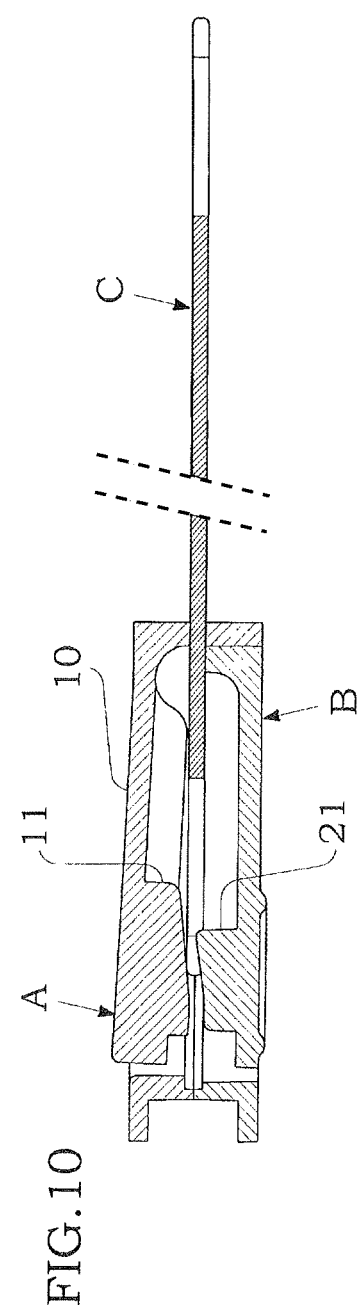

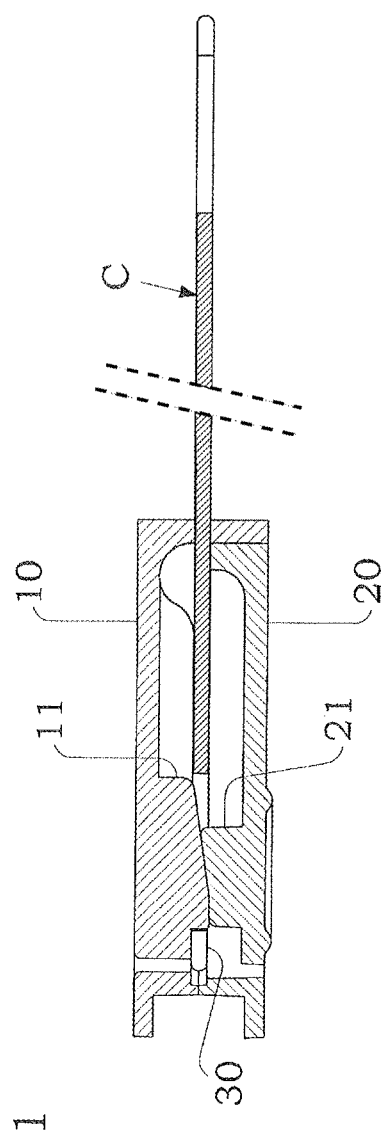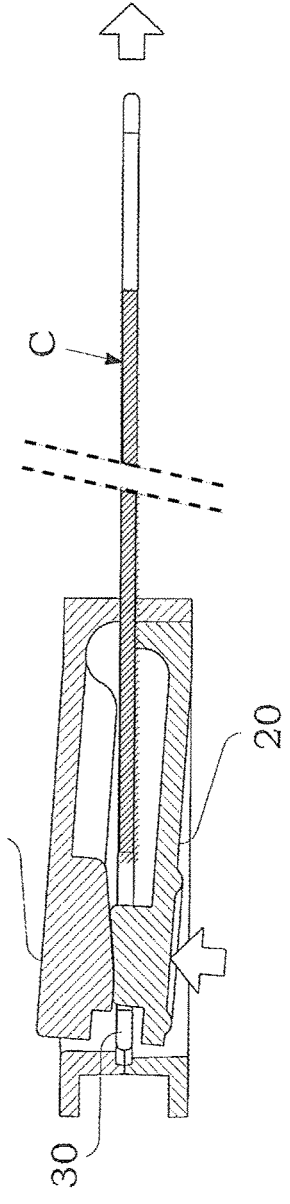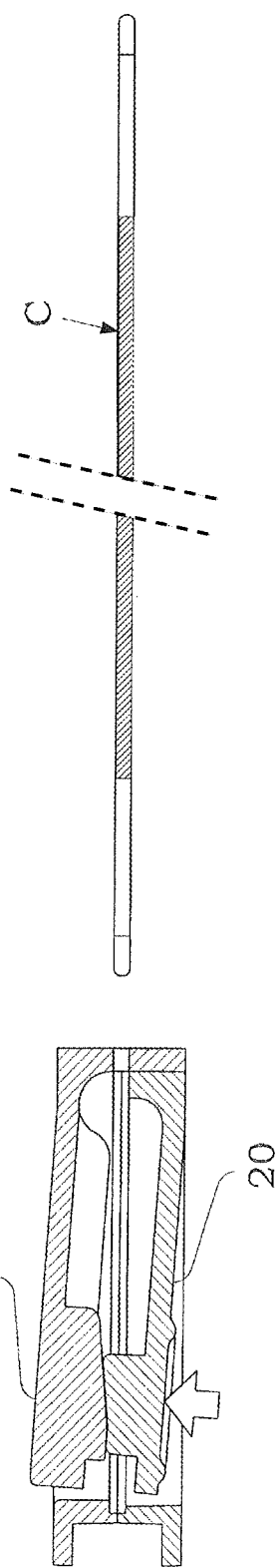

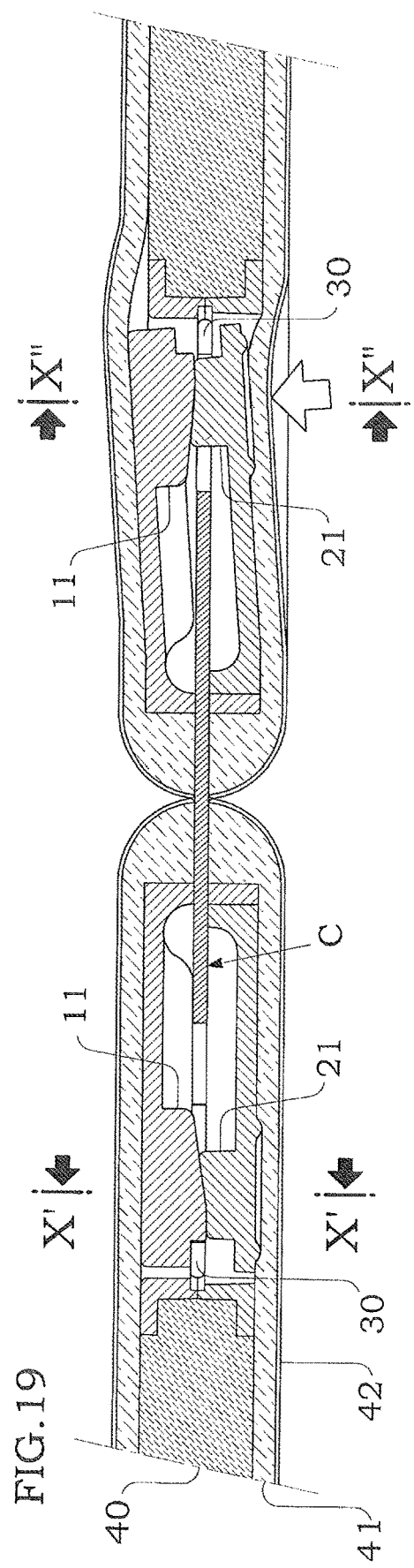
FIG.19
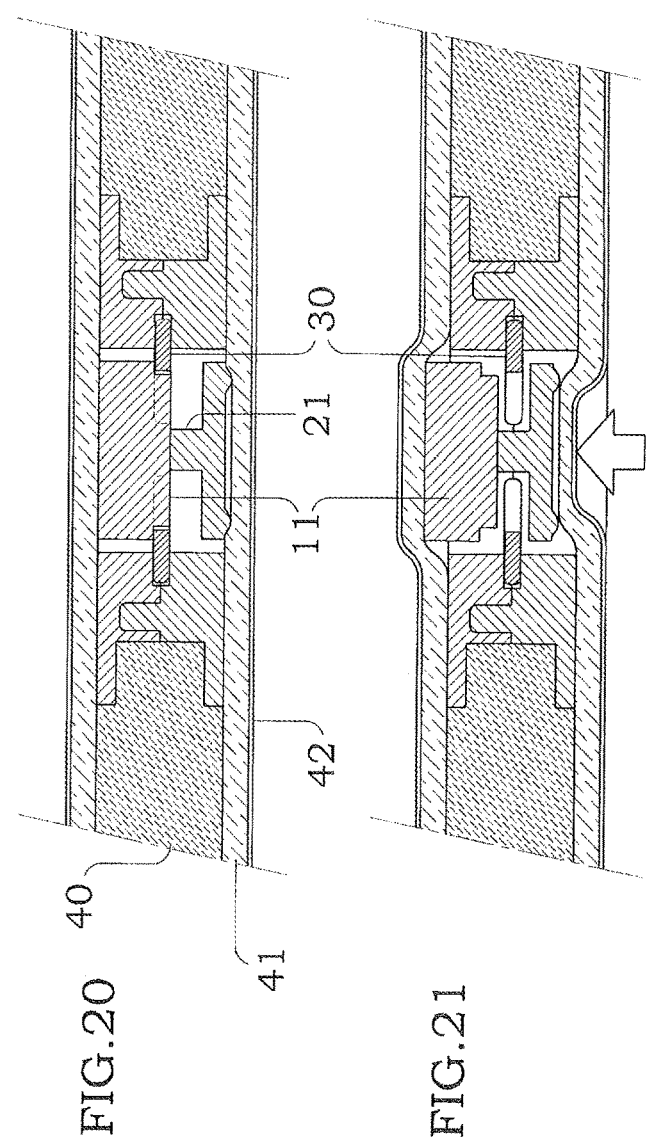
FIG.20
FIG.21

AUTOMATIC COUPLING DEVICE

The present invention relates to an automatic coupling device for elements, of furnishings and otherwise, to be connected and also separated, rapidly and without tools.

The aim of the invention is to limit the number of components of the present device to the minimum in order to limit its production costs and assembly times.

Within this aim, an object of the invention is to provide the device with the necessary strength while still limiting its bulk in order to not alter the design of the elements to which to apply it, and thus increase its possibilities for use.

Without ruling out other possibilities for use, one of the first intended uses for the present device is the modularity of furniture or of parts thereof and of panels for windbreaks and screens.

The characteristics of the invention are described below with the aid of the accompanying drawings, which include for the purposes of non-limiting example:

FIG. 1 is a perspective view of a coupling device and of the element to be inserted in it in order to couple it;

FIGS. 2 and 3 are perspective views of the device opened, i.e. of the interior of two components;

FIG. 4 is a view of the inner side and FIG. 5 is a longitudinal cross-sectional view taken along the central plane of a first component;

FIG. 6 is a view of the inner side and FIG. 7 is a longitudinal cross-sectional view taken along the central plane of a second component;

FIG. 8 is a longitudinal cross-sectional view taken along the central plane and FIG. 14 is a transverse cross-sectional view taken along the plane of the assembled device;

FIGS. 9, 10 and 11 are longitudinal cross-sectional views taken along the central plane of the device during insertion and coupling of an element;

FIGS. 12 and 13 are longitudinal cross-sectional views taken along the central plane of the device during the manual operation to release and extract the element shown in FIGS. 10 and 11;

FIG. 19 is a longitudinal cross-sectional view of two screen panels which are fitted out and joined according to the invention;

FIGS. 20 and 21 are, respectively, transverse cross-sectional views of the device.

From the accompanying drawings it can be seen that the present device is a form of box-like enclosure defined by the union of the components A and B alone, which are already adapted externally for fixing in place and internally for coupling automatically, and also releasing, a rigid element C which is previously coupled or to be coupled to another, similar device, or which protrudes from any fixed or mobile structure.

While the rigid element C is obtained preferably from a laser-cut metal plate, the components A and B are made by way of injection molding from polypropylene or another material adapted to make it possible for the tab arranged in the central region of both components to bend elastically under the action of external forces in order to then resume the initial configuration upon the cessation of such forces.

In fact, operation of the present invention is based generally on the fact that two raised portions protrude from the inner face of the above mentioned flexible tabs and act against each other, one of such raised portions being designed to automatically engage the element C while the other, if pushed manually, must act against the first one until the element C is uncoupled.

Figure 16:
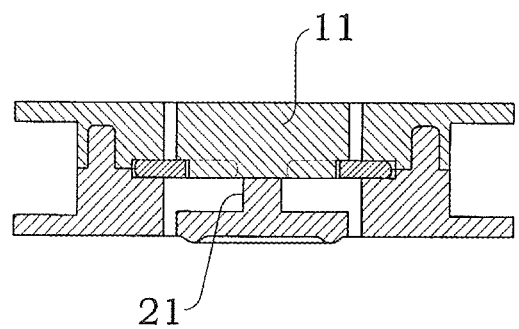
FIG. 16 is a further transverse cross-sectional view of the device.

Therefore in the element C, a pair of grapnels 30 protrude from each one of the ends to be coupled so that the end portions of such grapnels, folded and mutually opposite, can remain coupled, as in FIGS. 11 and 16, against the raised portion 11 of the tab 10 while the gap 31 existing between the end portions of the grapnels 30 prevents them from interfering with the raised portion 21 of the tab 20 during the removal of the released element C.

From the drawings which show the components A and B both before and after their coupling, it can be seen that their joining, which is obtained by inserting the raised portions 24 in the seats 14 and the screws in the seats 16 and 26, produces the perfect approach of the portion 13 to the portion 23 and the closing of the device whose edge, except on the front, is U-shaped thanks to the raised portions 15 and 25 which make it possible to slot it on the rigid part of a panel or of another structure to be equipped, where it is fixed with through screws for the seats 19 of the faceplate 17 rising from the component A in order to close the device at the front.

Figure 14:
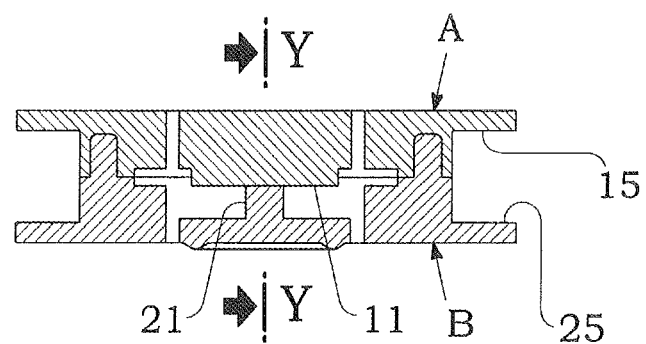
Figure 15:
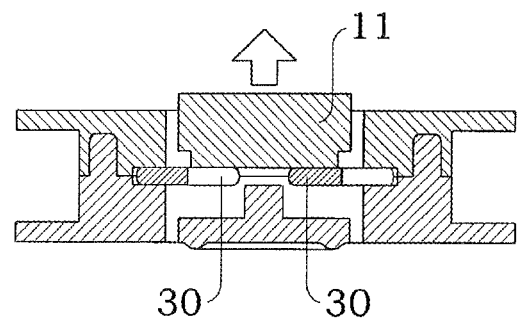
FIG. 15 is a transverse cross-sectional view of the device.

Also in the faceplate 17 is the access slit 18 for the element C whose insertion into the device is guided by the recessed seats 12 and 22 arranged in the components A and B for receiving and retaining the margins of the element C which in this manner is forced to advance by lifting, as in FIGS. 10 and 15, the wedge-like raised portion 11 of the flexible tab 10 up to when, with the coupling complete, the tab elastically returns to its initial configuration and maintains the raised portion 11 so as to lock the folded ends of the grapnels 30.

Figure 17:
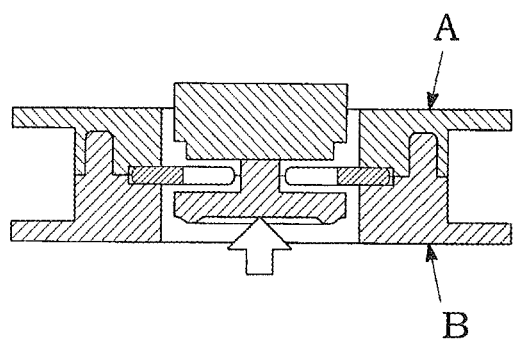
FIG. 17 is a further transverse cross-sectional view of the device.
Figure 18:
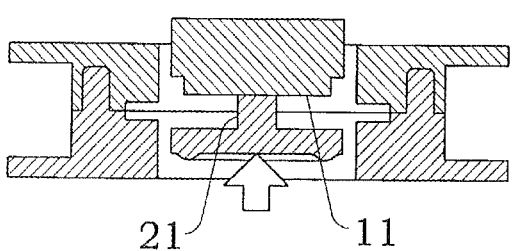
FIG. 18 is a further transverse cross-sectional view of the device.

In the component B, at the flexible tab 10 of the component A, there is a similar flexible tab 20 from which protrudes the raised portion 21 which, since it has to be pushed manually against the raised portion 11 in order to make it possible to release and extract the element C as in FIGS. 12 and 17, has a smaller bulk in terms of width than the gap 31 between the folded portions of the grapnels 30 in order to not obstruct the exit passage thereof.

Observing the cross-sectional views of the two screen panels in FIGS. 19, 20 and 21, which are shown by way of example in that they are equipped and joined to each other according to the invention, it can be seen that in such panels the box-like enclosure of the coupling device, which is defined by the components A and B, is fixed to the rigid polyurethane structure 40 and, with this, it is covered by a layer of soft polyurethane 41 and by a covering 42 of fabric or other material that can follow the movement of the flexible tabs 10 and 20.

It is obvious that even though the example shown and described relates to the joining of two co-planar panels, the possibility is not ruled out that, in the same way, angled joins of any type can be obtained simply by arranging elements C folded in the angle to be formed with the joined panels. Furthermore the possibility is not ruled out that there can also be coupling elements to be stably fixed to a structure, fixed or mobile, from which the single end for coupling protrudes, as well as elements with more than two ends for coupling, or T-shaped or even cross-shaped elements.

Finally, without prejudice to the general characteristics illustrated and described, the scope of protection of the present invention also includes those possible embodiments which, although not shown or described, are in any case referable to one or more of the characteristics described and claimed herein.

The disclosures in Italian Utility Model Application No. RA2015U000011 from which this application claims priority are incorporated herein by reference.

The invention claimed is:

1. An automatic coupling device comprising:
    a box-like enclosure; and
    a rigid laminar element,
    wherein arranged in two opposing walls of the box-like enclosure are first and second flexible tabs from which first and second raised portions which act against each other protrude inward, the first raised portion being adapted to engage the rigid laminar element, the rigid laminar element configured to be inserted between the two flexible tabs, the second raised portion, in a coupled configuration, is adapted to be pushed manually to move the first raised portion and release the rigid laminar element,
    wherein the rigid laminar element comprises a pair of grapnels, the pair of grapnels comprising a first grapnel and a second grapnel, the pair of grapnels protrude from an end of the rigid laminar element, wherein an end of each grapnel is angled as compared to other portions of each grapnel, and wherein the first grapnel is opposed to the second grapnel, wherein the pair of grapnels can remain coupled by the first raised portion of the tab, and wherein a gap remains between the end of each grapnel that prevents the pair of grapnels from contacting the second raised portion of the tab in a partially released configuration of the rigid laminar element.

2. The device according to claim 1, wherein the insertion in the automatic coupling device of the rigid laminar element is guided by recessed seats which are arranged in said opposing walls of said box-like enclosure at end portions of a slit for receiving and retaining margins of the rigid laminar element which is thus forced to advance by lifting the first raised portion of the first flexible tab, of the two flexible tabs, to the coupled configuration, when the first flexible tab elastically returns to its initial configuration and maintains the first raised portion so as to lock a folded end of the at least one grapnel.

3. The device according to claim 2, wherein an edge of the box-like enclosure obtained by joining the opposing walls of the box-like enclosure is, except on the front, U-shaped due to further raised portions which make it possible to slot it on the rigid part of a panel or of another structure to be equipped, where it is fixed with through screws for seats of a faceplate which is provided with the slit and rises from one of the opposing walls in order to close the automatic coupling device at the front.

4. The device according to claim 1, wherein the second raised portion, having to act against the first raised portion in order to decouple and allow the extraction of the rigid laminar element, is dimensioned and positioned to protrude from the second flexible tab so as not to obstruct the passage of the at least one grapnel of the rigid laminar element.

5. The device according to claim 1, wherein in the coupled configuration, the second raised portion contacts the first raised portion at a position between the two grapnels.

* * * * *